(12) United States Patent
Sanklecha et al.

(10) Patent No.: US 12,524,938 B2
(45) Date of Patent: Jan. 13, 2026

(54) CUSTOMIZED USER INTERFACE TEMPLATIZATION

(71) Applicant: Microsoft Technology Licensing, LLC, Redmond, WA (US)

(72) Inventors: Pooja Sanklecha, Hyderabad (IN); Loknadh Madasu, Hyderabad (IN); Rajat Anand, Hyderabad (IN); Anubhav Mehendru, Hyderabad (IN); Deepak Kumar Pratinidhi, Hyderabad (IN); Shivam Singh, Hyderabad (IN)

(73) Assignee: Microsoft Technology Licensing, LLC., Redmond, WA (US)

( * ) Notice: Subject to any disclaimer, the term of this patent is extended or adjusted under 35 U.S.C. 154(b) by 203 days.

(21) Appl. No.: 18/404,321

(22) Filed: Jan. 4, 2024

(65) Prior Publication Data
US 2025/0225696 A1    Jul. 10, 2025

(51) Int. Cl.
G06T 11/60    (2006.01)

(52) U.S. Cl.
CPC .......... *G06T 11/60* (2013.01); *G06T 2200/24* (2013.01)

(58) Field of Classification Search
CPC ....................................................... G06T 11/60
USPC ....................................................... 715/202
See application file for complete search history.

(56) References Cited

U.S. PATENT DOCUMENTS

| | | | | |
|---|---|---|---|---|
| 9,122,669 B2* | 9/2015 | Demant | ................ | G06F 40/186 |
| 9,858,361 B2* | 1/2018 | Fernandez | ......... | G06Q 30/0601 |
| 10,769,829 B2* | 9/2020 | De Gaetano | ............ | G06F 16/50 |
| 11,537,283 B2* | 12/2022 | Gonzalez | .............. | G06F 40/197 |
| 11,829,369 B2* | 11/2023 | Norrby | ............... | G06F 16/2379 |
| 12,147,646 B2* | 11/2024 | Jacobson | .............. | G06F 3/0483 |
| 2008/0313552 A1* | 12/2008 | Buehler | ............... | G06K 15/021 715/760 |
| 2009/0100362 A1* | 4/2009 | Sauve | ...................... | G06F 8/36 715/765 |
| 2010/0042989 A1* | 2/2010 | Anand | .................. | H04L 41/145 717/176 |

(Continued)

OTHER PUBLICATIONS

Dynamic Yield., "Creating Templates" Retrieved from: https://support.dynamicyield.com/hc/en-us/articles/360022735973-Creating-Templates, retrieved on: Oct. 23, 2020, 14 pages.

(Continued)

*Primary Examiner* — Reza Nabi
(74) *Attorney, Agent, or Firm* — Foley IP Law, PLLC

(57) ABSTRACT

A system and method for application templatization that receives, via a template adapter, selection of a template for customization of content display for an application. Selections of template configuration options are received for the selected template. The selected template and template configuration options are stored with a template identifier for the application. A network call is received to fetch content for the application upon launch of an instance of the application at a user device. The network call includes the template identifier. In response to receiving the network call, content for the application is fetched and the template is retrieved using the template identifier. The fetched content is mapped to sections of the stored template using the stored template configuration options and the mapped application content is rendered for display on a user interface device.

17 Claims, 7 Drawing Sheets

(56) References Cited

U.S. PATENT DOCUMENTS

| | | | | |
|---|---|---|---|---|
| 2011/0004839 | A1* | 1/2011 | Cha | G06F 9/451 715/765 |
| 2011/0047477 | A1* | 2/2011 | White | G06Q 30/02 715/747 |
| 2011/0289437 | A1* | 11/2011 | Yuen | G06F 16/958 715/762 |
| 2012/0166985 | A1* | 6/2012 | Friend | G06F 9/454 715/765 |
| 2012/0330995 | A1* | 12/2012 | Muenkel | G06F 40/18 715/219 |
| 2013/0290149 | A1* | 10/2013 | Rashwan | G06Q 30/0641 705/27.1 |
| 2014/0229270 | A1* | 8/2014 | Rashwan | G06Q 30/0277 705/14.43 |
| 2014/0280770 | A1* | 9/2014 | Burckart | G06F 40/186 709/219 |
| 2014/0282398 | A1* | 9/2014 | Podolyak | G06F 8/36 717/121 |
| 2014/0282399 | A1* | 9/2014 | Gorelik | G06F 8/71 717/122 |
| 2015/0020010 | A1* | 1/2015 | Hale | G06F 3/04842 715/765 |
| 2015/0193090 | A1* | 7/2015 | Grover | G06F 9/451 715/745 |
| 2016/0063595 | A1* | 3/2016 | Oral | G06Q 30/0621 705/26.7 |
| 2017/0180526 | A1* | 6/2017 | Shukla | H04M 3/42042 |
| 2017/0270497 | A1* | 9/2017 | Tsou | G06Q 20/12 |
| 2017/0270505 | A1* | 9/2017 | Tsou | G06Q 20/209 |
| 2017/0315782 | A1* | 11/2017 | Chaudhry | G06F 9/4881 |
| 2017/0346970 | A1* | 11/2017 | Kodimer | H04N 1/32122 |
| 2018/0095653 | A1* | 4/2018 | Hasek | G06F 3/04883 |
| 2018/0183953 | A1* | 6/2018 | Ormond | H04N 1/0097 |
| 2018/0249022 | A1* | 8/2018 | Webb | H04N 1/00511 |
| 2019/0230124 | A1* | 7/2019 | Hodgman | H04L 67/1036 |
| 2020/0184420 | A1* | 6/2020 | Dange | G06F 16/93 |
| 2022/0107790 | A1* | 4/2022 | Naghshin | G06F 40/186 |
| 2025/0225696 | A1* | 7/2025 | Sanklecha | G06T 11/60 |

OTHER PUBLICATIONS

Joseph Seddik ., "Title Allowing for dynamic templates—easy change" Retrieved from: https://www.googlecloudcommunity.com/gc/Feature-Ideas/Allowing-for-dynamic-templates-easy-change/idi-p/421664, retrieved on: May 10, 2022, 6 pages.

Oracle, "User Interface Templates", Retrieved from: https://msft.anaqua.com/anaqua/Patent/PatentRelatedArt.aspx?RecordId=95039608, retrieved on: May 10, 2013, 33 Pages.

* cited by examiner

CUSTOMIZED USER INTERFACE TEMPLATIZATION

BACKGROUND

Cloud services enable powerful computing resources to be leveraged by users virtually anywhere without the need to maintain physical hardware, and often providing software capabilities to users without the need to download the software on a client-side device. In some instances, software applications are accessed primarily through the internet using cloud servers, and these applications are not stored or managed on a local device of a user Typically, applications leveraging cloud services distribute processing in some manner between remote servers of the cloud service provider and local user devices. Users interact with the application over the internet or through an application programming interface (API), with most of the data storage existing on the remote server, or cloud server.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Aspects of the disclosure include a system that receives a selection of a template from a plurality of templates for an application from a client device in a tenant environment. The template includes template parameters for content rendering and a template identifier. The system stores the selected template for the application in memory, and transmits the selected template to the client device for rendering content of the application. The application interface for the application on the client device is refreshed upon the template selection, and the selected template is cached on the client device upon receipt of the transmission. A network call is received for application content upon launch of an instance of the application executing on a user device within the tenant environment. The network call includes the template identifier. The system transmits the application content to the user device for rendering according to the selected template based on the template identifier.

Aspects of the disclosure include a system that receives a selected template for an application hosted at a cloud server, the selected template including a template identifier and template parameters. The system stores the selected template in memory and, responsive to receiving a request to launch an instance of the application, initiates a call to obtain application content from the cloud server. The system maps the application content obtained to sections of the selected template stored in the memory based on the template parameters, and renders the mapped application content according to the selected template on a user interface display.

Aspects of the disclosure further include a method for template customization that receives, via a template adapter, selection of a template for customization of content display for an application. Selections of template configuration options are received for the selected template and stored along with the selected template and a template identifier for the application. A network call is received to fetch content for the application upon launch of an instance of the application at a user device. The network call includes the template identifier. In response to receiving the network call, content is fetched for the application and mapping instructions are obtained for the content using the template identifier. The fetched content is mapped to sections of the stored template using the stored template configuration options, and the mapped application content is rendered for display at the user device according to the stored template.

BRIEF DESCRIPTION OF THE DRAWINGS

Corresponding reference characters indicate corresponding parts throughout the drawings. Any of the figures may be combined into a single example or embodiment.

DETAILED DESCRIPTION

Figure 1:
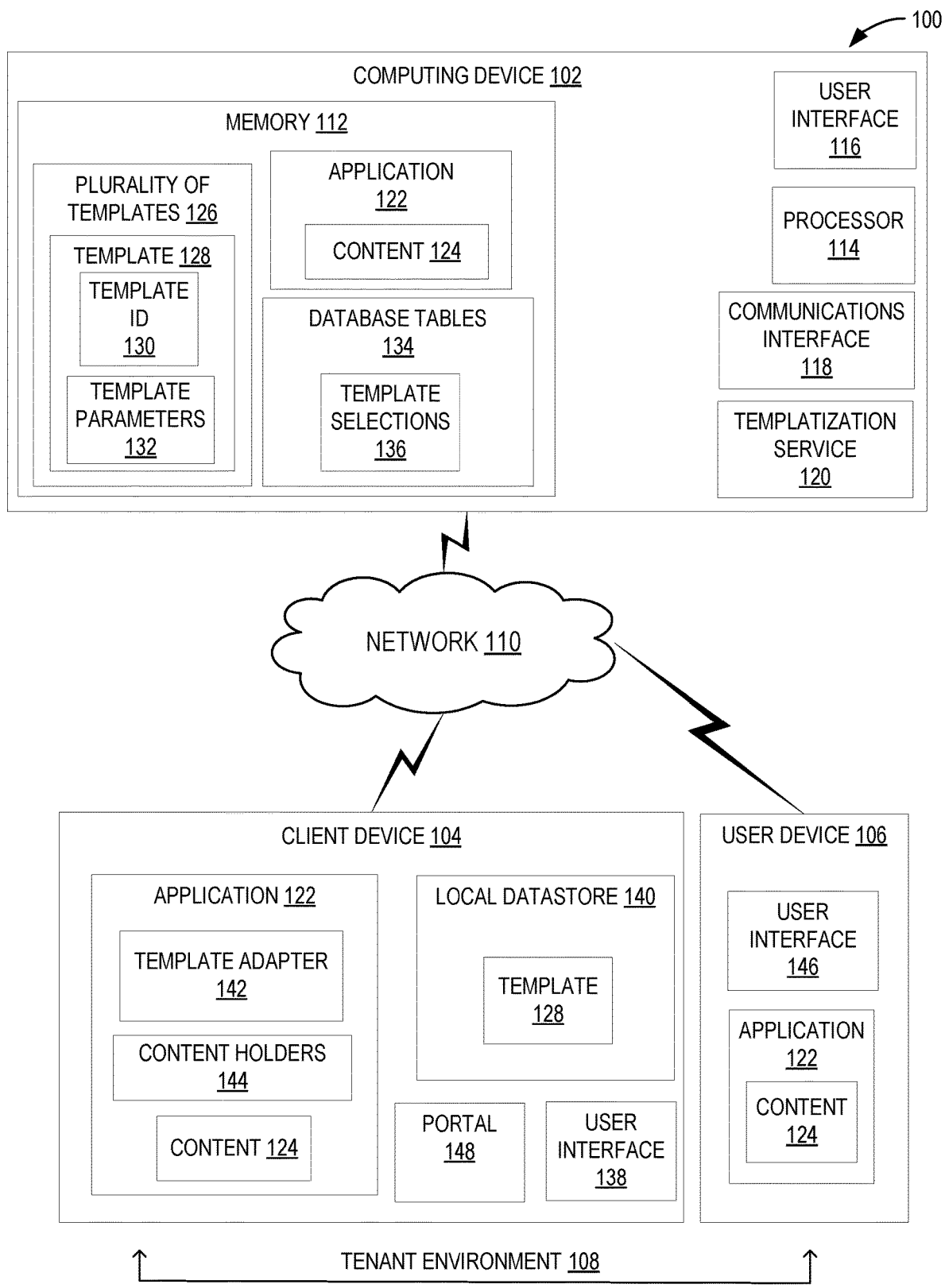
FIG. 1 is an exemplary block diagram illustrating a system for client-side template customization for service-provider hosted applications.

A more detailed understanding can be obtained from the following description, presented by way of example, in conjunction with the accompanying drawings. The entities, connections, arrangements, and the like that are depicted in, and in connection with the various figures, are presented by way of example and not by way of limitation. As such, any and all statements or other indications as to what a particular figure depicts, what a particular element or entity in a particular figure is or has, and any and all similar statements, that can in isolation and out of context be read as absolute and therefore limiting, can only properly be read as being constructively preceded by a clause such as "In at least some examples, . . . " For brevity and clarity of presentation, this implied leading clause is not repeated ad nauseum.

Existing service-based application approaches for organizations to update or change the layout of an application's user interface (UI) for that organization and its client devices are cumbersome and slow to implement. As used herein, a tenant may refer to an organization or enterprise that is a single tenant or multi-tenant organization. A tenant utilizes applications, such as enterprise software for example, which are hosted on external servers (e.g., cloud service providers) in order to leverage the application functionality and accessibility for tenant user devices without the burden and computational resource usage of hosting the applications on tenant, or client-side, servers. These external service providers, or cloud service providers, provide the computing resources and storage for hosting applications for the tenant, and also provide some customization options to the tenant for how application content is presented within the tenant environment. However, when the tenant wants to change the layout of application user interface (UI) elements on client devices within the tenant environment, the tenant must roll out a new application version for deployment to introduce the changes, leading to significant resource and bandwidth usage.

Aspects of the present disclosure provide technical solutions to the technical problem of updating or changing an application interface that are necessarily rooted in computer technology and further the art of user interface configuration for improved user-computer interaction and user data experience, by providing a templatization service that enables client-side template customization for application interface configuration and display and the layout of the same using templates that are selectable and configurable by a tenant in the client-side environment. This is accomplished, at least in part, by templates that are selected from a plurality of available pre-configured and customizable templates provided by the templatization service, and cached on the tenant-side or client-side based on template identifiers (IDs), for efficient client-side rendering and control of a client data experience with reduced latency and improved resource usage. A tenant selects between multiple templates offered by the service provider to update the application configuration and UI representation of data for an application accessible across client devices of the tenant environment without requiring new application roll outs or deployments for updated versions of an application.

In addition to pre-configured templates, aspects of the disclosure provide customizable templates, enabling tenants to customize template configurations for content types and content rendering of an application. In some examples, a default template is provided for use in creating a tenant-specific customizable template. Each customized template includes tenant-selected template parameters, template configuration options, and content type selections that define the application content and UI representation of the content of the application for presentation on tenant client devices. The service provider deploys the customized template to the tenant environment to update the application on client devices and caches the customized template to local storage at the tenant-side for future application launches enabling the tenant-side client devices to render the application content according to the customized template stored on the tenant-side without a separate network call to the service provider, thus improving computational efficiency and reducing latency and computer resource usage.

The disclosed method and system operates in an unconventional manner by offering multiple pre-configured and customizable templates for tenant customization of an application presented on tenant client devices that are locally cached to control application content rendering on the tenant-side, or client-side, without network calls to the service provider when an application is launched, enabling client-side customization and control of client data experience without new application deployment. In this manner, the computing device of the disclosed method and system is used in an unconventional way, and allows the tenant to control application updates and changes across the tenant environment, and across different types of client devices, in real-time or near real-time, thereby improving user interaction with the underlying computing device, reducing computing resource usage and network bandwidth usage, and improving computational efficiency.

The various examples will be described in detail with reference to the accompanying drawings. Wherever preferable, the same reference numbers will be used throughout the drawings to refer to the same or like parts. References made throughout this disclosure relating to specific examples and implementations are provided solely for illustrative purposes but, unless indicated to the contrary, are not meant to limit all examples.

FIG. 1 is an exemplary block diagram illustrating a system for client-side template customization for service-provider hosted applications. Templatization architecture 100 provides a client-side template customization environment. Templatization architecture 100 includes computing device 102, client device 104 and user device 106, in an illustrative example. Client device 104 and user device 106 operate within a tenant environment 108 ("tenant"). Tenant environment 108 may be an enterprise organization environment, or a commercial enterprise environment, within which customized application presentation is provided for user devices or user data experiences within or associated with the environment, in some examples. Computing devices 102, client device 104 and user device 106 are communicatively connected via network 110.

Computing device 102 includes memory 112, processor 114, user interface 116, communications interface 118, and templatization service 120. Memory 112 stores applications hosted by a service provider (e.g., a cloud service provider) such as application 122, and application content, such as content 124. Memory 112 also includes plurality of templates 126, accessible via templatization service 120 for selection and customization by client device 104 over network 110. Plurality of templates 126 includes default templates, pre-configured (or pre-defined) templates, and customizable templates, which will be described in more detail below. Template 128 is an example of a template in plurality of templates 126. Each template includes a template identifier (ID) and template parameters, such as template ID 130 and template parameters 132 of template 128. A template ID is a unique identifier for an individual template associated with an individual application and tenant, or organization. That is, the template ID identifies which template a tenant has selected for use with a particular application when that application is rendered on tenant-related devices or within the tenant environment. Memory 112 includes database tables 134, which store template selections, such as template selections 136. Template selections include template IDs and application associations, template parameters for each template, and mapping instructions for mapping application content to a given template. The mapping instructions are stored in database tables 134 and, in some examples, are stored in multiple tables according to mapping types, such as overall template mapping, tab-screen mapping, screen mapping, section mapping, and the like. The mapping instructions associated with a given template control how application content, such as content 124, is mapped to sections or elements of a user interface (UI) for application presentation or display on a client-side device, such as user interface 138 of client device 104, for example.

When an instance of application 122 is launched at client device 104, for example, content 124 is fetched via a network call over network 110 and rendered on user interface 138 according to a currently selected template for application 122. The template controls how the content 124 is rendered at user interface 138. The template 128, selected and/or customized through templatization service 120 and stored in memory 112, is transmitted (or received) at client device 104 upon a next launch, or refresh, of the application 122 after the template selection and/or customization is made. Upon transmission (or receipt) of template 128, template 128 is cached at local datastore 140 on client device 104. Template adapter 142 is an application programming interface (API) that uses template 128 to initiate content-specific network calls to fetch application content using content holders 144. Template adapter 142 is used to define the user interface based on the data received from templatization service 120, such as creating the required number of tabs, providing names to those tabs, initializing sections within the tabs, and providing required view holders, or content holders, in each section, for example. The fetched application content is then mapped to UI containers, or elements, of UI 138 for rendering content 124 of application 122 for presentation and display on UI 138.

Templatization service 120 is accessed by client device 104 via portal 148, which enables user selection and customization at client device 104. Portal 148 is a web client that accepts access token and validates these token for specified roles and authentication. Once a token is validated, the API called via portal 148 web client runs the command and attempts to change the active template for a tenant in the database, such as database tables 134. Once the active template for a given application, for the tenant is updated in the database, the client device will pull the updated, or current, template for the tenant upon relaunching the application on the client device. When the client device pulls the current template (the template currently set as the active template for the tenant in the database) from the database call, the client device applies the template at that particular time to the application content, including multi-media content such as videos, images in a particular orientation, scroll direction for media files, and so on.

With template 128 cached at local datastore 140, on the client-side or within tenant environment 108, when user device 106 launches an instance of application 122, the client-side cached template is used to render content 124 for user interface 146, without having to retrieve a template or mapping instructions from the service provider for content rendering at user device 106. That is, template calls associated with the tenant API and UI configuration is performed on the client-side, based on the template ID, using the cached template and template parameters for UI configuration. Client, or tenant, customization is provided in near real-time with application presentation updated at run-time upon reloading or refreshing of the application on the client device, with application content rendered according to the update or change using the client-side cached template. Based on the template selected, different users of an application can see the same data rendered differently, the UI experience will be different without having to go through the application cycle of deployment. This is driven from the templatization service and portal 148, allowing any change in the template configuration, or template selection, for a tenant to be reflected on tenant-device applications upon relaunch of the application on the client device or tenant-associated devices.

Data type management is performed on the service provider side, such as at computing device 102. Data type management includes updating the active template for a tenant in the database, such as database tables 134, and performing create, read, update, and delete (CRUD) operations on the templates. These types of actions, or data type management, are performed on the provider side, such as at computing device 102, while the template selection and/or customization is performed at the client-side, such as at client device 104.

Template parameters 132 are configuration settings that define the mapping of application content to template elements to control the user data experience and visual appearance of the application rendered for display on the user interface. The template parameters 132 include, for example, without limitation, a number of tabs in the template, a number of sections in the template, number of sub-sections within a section of the template, tab headings or tab names, content types enabled in the template, content types associated with individual tabs and/or sections of the template, action types enabled in the template, action types associated or assigned to individual tabs and/or sections of the template, UI container placement within a template, orientation of content within a section or sub-section, enabled reactions (e.g., like or thumbs up, share, comment, etc.), and so forth. Content types, for example, include types of multi-media, such as videos, images, text, audio, or interactive elements, such as action cards, announcements, polls, trainings, and so forth. Each content type can include an associated directional control, such as a scroll direction appended to the content type. These directional controls can also be included in the action types of the template parameters. Action types include, for example, scroll direction (e.g., horizontal or vertical), navigation instructions (e.g., button, hyperlink, etc.) timing instructions (e.g., play upon section load, require trigger to play, etc.), reactions (like, dislike, share, comment functionalities) and the like. The template parameters may be pre-configured in some templates, and may be fully customizable in other templates.

Computing device 102, client device 104, and user device 106 represent a computing device capable of executing an application and may take various forms of implementations not limited to the illustrative descriptions herein. For example, computing device 102, client device 104, and/or user device 106 can be a desktop computer, an entertainment appliance, a set-top box communicatively coupled to a display device, a game console, a mobile computer, a handheld computer, a portable device, and so forth. Each described computing device herein can range from a full resource device with substantial memory and processor resources (e.g., personal computers, game consoles) to a low-resource device with limited memory and/or processing resources (e.g., traditional set-top boxes, hand-held game consoles). A mobile computing device includes, for example but without limitation, a mobile telephone, laptop, tablet, computing pad, netbook, mobile station, gaming device, wearable device, and/or portable media player. Furthermore, the computing devices described herein can represent a group of processing units, distributed processing systems, or other computing devices.

Tenant environment 108 can be an individual or entity using hosting services of a service provider, such as a cloud service provider. Tenant environment 108 can include a single tenant, a multi-tenant entity, or a commercial tenant with its own subscribers. In a multitenancy architecture, multiple customers of a service provider share the same computational resources while each tenant's data is kept separate from one another. The service provider can provide a multitenancy architecture for hosting application 122 using many types of cloud computing, including infrastructure-as-a-service (IaaS), platform-as-a-service (PaaS), software-as-a-service (SaaS), containers, and serverless computing.

A tenant-side client device, such as client device 104, manages customization and presentation for application 122 across all tenant environment client-side devices and customer devices, such as user device 106, receiving or accessing application 122 via tenant environment 108. In this manner, a tenant is enabled to control application customization and presentation across all tenant-associated devices on the client-side without new application rollout or deployment of application updates.

Network 110 represents a variety of different networks, including the Internet, a wide area network (WAN), a local area network (LAN), a software defined network (SDN), a cellular or other wireless network, an intranet, other public and/or proprietary networks, combinations thereof, and so forth.

Figure 2:
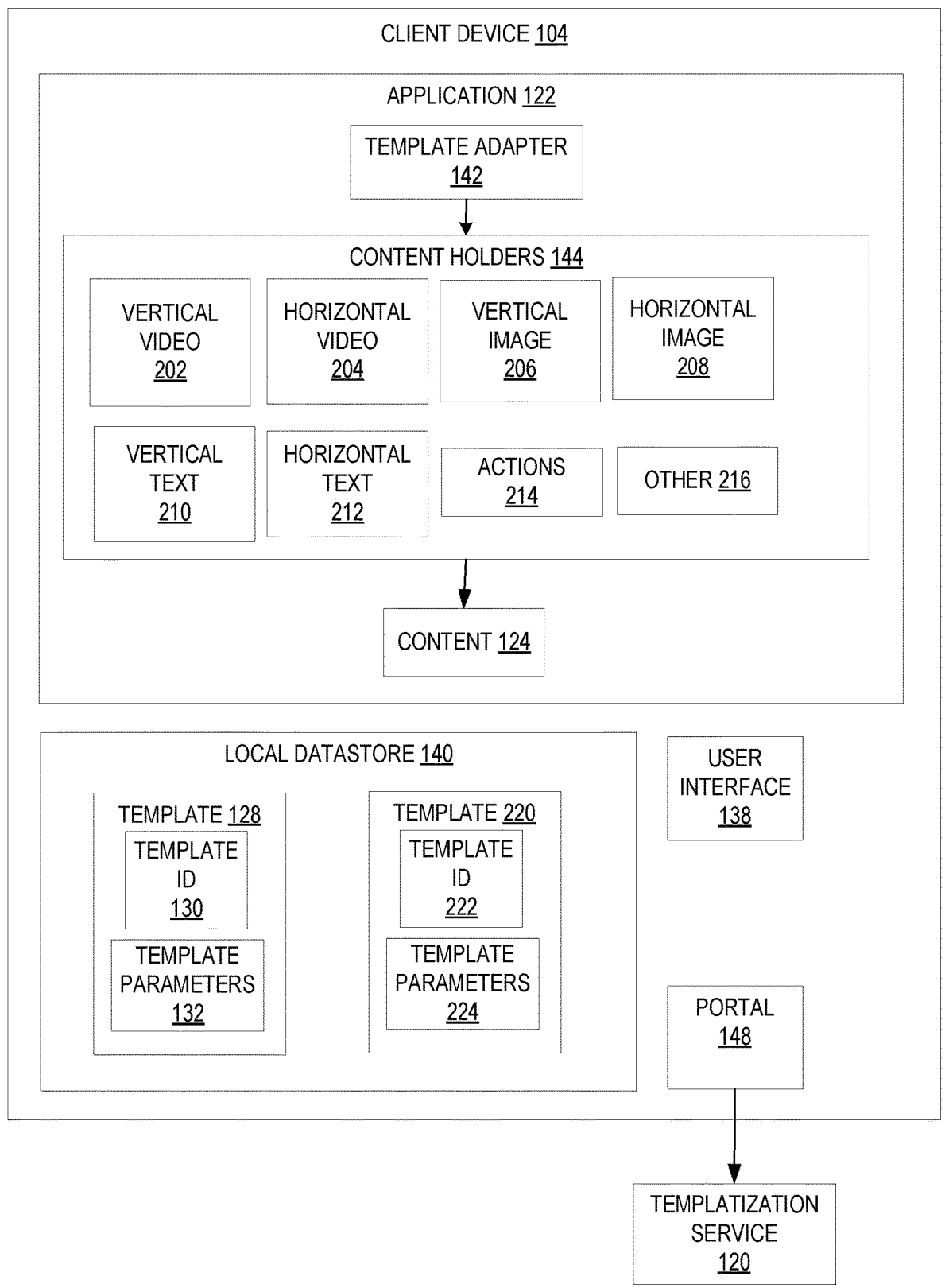
FIG. 2 is an exemplary block diagram illustrating a system for client-side template customization for service-provider hosted applications.

FIG. 2 is an exemplary block diagram illustrating a system for client-side template customization for service-provider hosted applications. As illustrated here, client device 104 manages customization and updates for application 122 using portal 148 to access templatization service 120 at the service provider-side to select and/or customize a template, and template adapter 142 on the client-side to control the content rendering and application display according to the stored template. Template adapter 142 uses content holders 144 to initiate network calls for application content, such as content 124, in order to fetch the content for the application upon application launch to render at user interface 138. Content holders 144 includes a number of different types of content holders, such as vertical video 202, horizontal video 204, vertical image 206, horizontal image 208, vertical text 210, horizontal text 212, actions 214, and other 216. Other 216 may include interactive elements, such as action cards, announcements, polls, trainings, reactions, and the like. Each content holder is associated with a single type of content, and fetches that type of content for a given application.

Template adapter 142 controls the rendering of the content fetched by content holders 144 using template 128, cached at local datastore 140. The correct, or active, template for a tenant is identified using the template ID provided from the access token received in the network call. Template parameters 132 provide mapping instructions from template adapter 142 to map content 124 to containers or elements of user interface 138 to render content 124 for presentation of application 122 at client device 104.

In some examples, template 128 is a default template stored on client device 104, and an application manager within tenant environment 108 can further customize template 128 using templatization service 120 via portal 148 to configure template parameters and create a tenant-customized template, such as template 220. The template ID 222 for template 220 will be distinct, and template parameters 224 will be used by template adapter 142 upon refresh or relaunch of application 122, to apply the customizations selected for template 220. In other examples, incremental changes, updates, or customizations are made using templatization service 120, and each iterative change, update, or customization generates a new template that is stored at memory 112 of the server-side provider computing device 102 as the active template for the tenant, and transmitted over the network and cached at the client-side local datastore 140 upon receiving a network call to fetch the active template for the tenant. In this way, client-side changes and updates are made and applied through the templatization service to content rendering and application presentation the next time content is fetched, such as upon a network call for the application content upon an application launch or refresh.

The template parameters, such as template parameters 132 or customizable template parameters 224, can include configuration settings for, or configurable options to select, content type, a number of sections, a section name, a number of tabs, a tab name, an action type, and other settings or options. In some examples, a tab includes multiple sections. In some examples, each section is limited to a single content type. As used herein, a section may refer to a container of a UI. Each section can include a direction instruction or directional parameters, such as a scroll direction for the associated content type (e.g., horizontal scroll, vertical scroll) independent of the scroll direction of other UI elements or sections, or of the application interface as a whole. Configuration of UI sections provide further customization options for controlling the look-and-feel of the of the application layout and data presentation.

Figure 3:
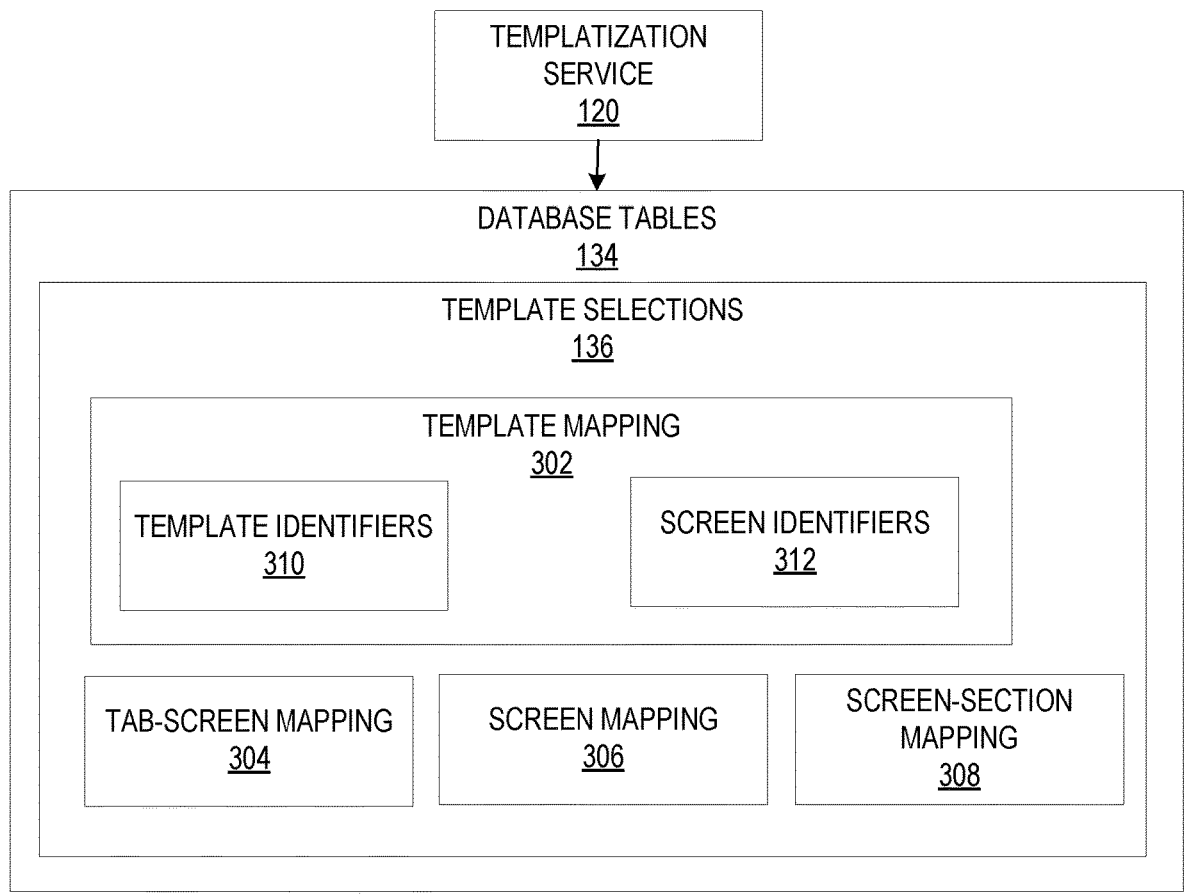
FIG. 3 is an exemplary block diagram illustrating a templatization service for client-side template customization.

FIG. 3 is an exemplary block diagram illustrating a templatization service for client-side template customization. Templatization service is provided, and executed, by a computing device, such as computing device 102 as illustrated in FIG. 1. Templatization service stores template selections 136, which are selected and/or customized templates, within database tables 134 for persistent storage at the server-side. Template selections 136 are stored in various tables within database tables 124, which are then used to map application content according to a given template identified by a template ID in template IDs 310. For a given active template for a tenant an individual, unique template ID in template IDs 310 within template mapping 302, which is a database table that may be represented as TenantTemplateMapping in some examples. Based on the template id for the given template, the mapping instructions for particular tabs of the template are applied from tab-screen mapping 304, which is a database table that may be represented as TemplateTabScreenMapping in some examples. Each template ID maps to a Screen ID, for a particular tenant, which includes additional details and number of sections attached to it in the table screen mapping 306, which is a database table that may be represented as TenantScreenMapping, in some examples. After obtaining the template ID, for a particular tab, the section details for a particular screen are obtained from screen-section mapping 308, which is a database table that may be represented as ScreenSectionMapping table, in some examples. A json response is formed out of this process of identifying and retrieving the mapping instructions from the individual database tables according to the template ID and provided to the application clients, which then consume to render the screen in a particular format, in some examples. The template selections 136 includes mapping instructions for application content according to an individual template. The template selections include template mapping 302, tab-screen mapping 304, screen mapping 306, screen-section mapping 308, in addition to template identifiers 310.

After the network call for the template returns the template to the client, the template is set as the active template for a tenant in template mapping 302. The API, such as template adapter 142, requests section details for the selected template and uses the provided section details to update section mapping 306 associated with the active template and corresponding template ID. A database call from a mobile client device using a template ID fetches the template details by identifying the active template for the tenant in template mapping 302 based on the template ID. Based on the template ID, a screen identifier (ID) is identified from screen identifiers (IDs) 312. A screen ID (or screenid) for a particular tenant has additional details for particular tabs stored in tab-screen mapping 304, and additional details and number of sections attributed to the template in screen mapping 306. The screen ID for a particular tab obtained from tab-screen mapping 304 provides the section details for a particular screen from screen-section mapping 308.

Figure 4:
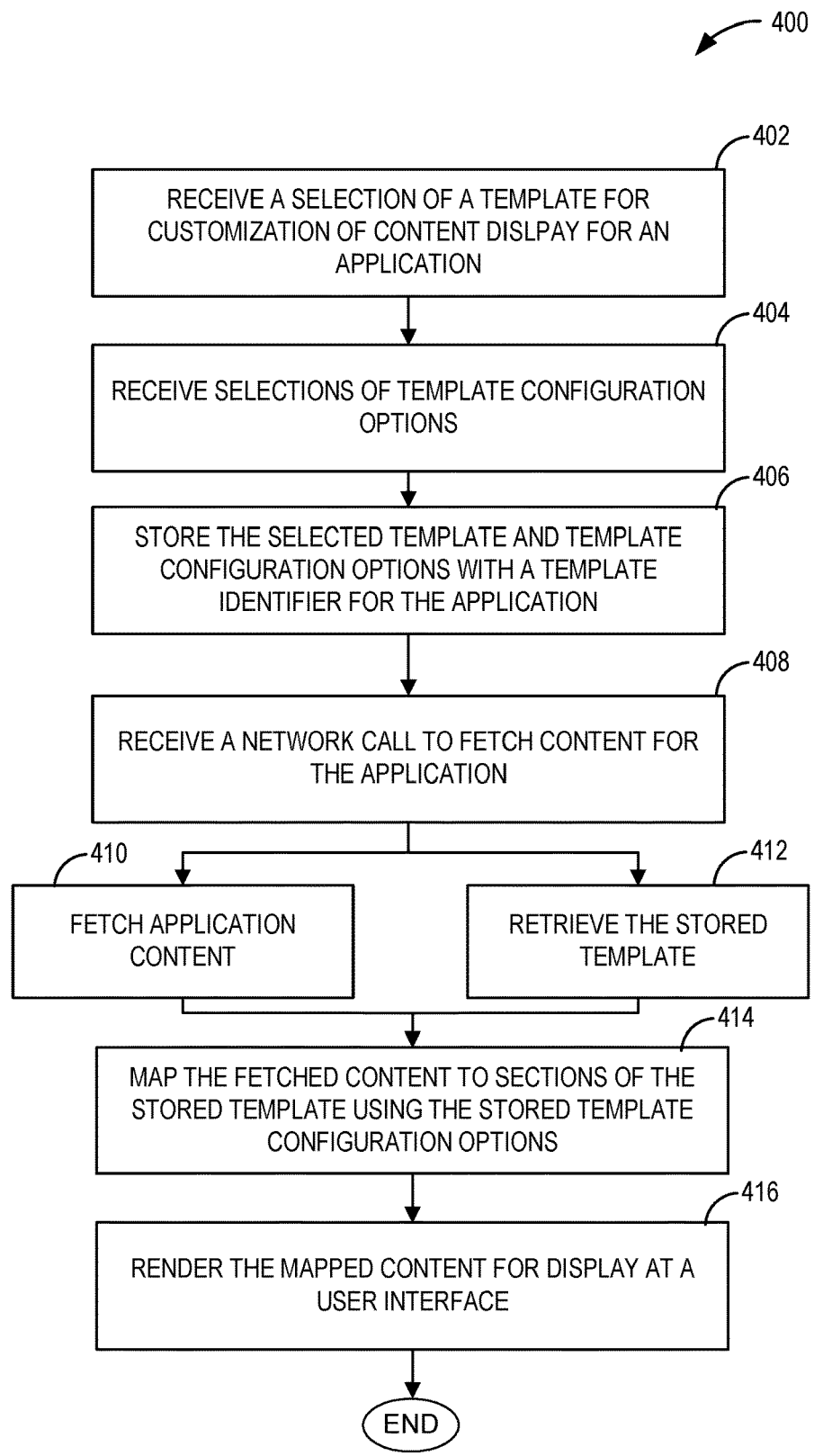
FIG. 4 is an exemplary flow chart illustrating an example process for templatization at a client device.

FIG. 4 is an exemplary flow chart illustrating an example process 400 for templatization at a client device. The process 400 can be implemented by a processor executing instructions on a computing device, such as computing device 102 in FIG. 1. The process 400 may be implemented within the architectures described in FIGS. 1 and 2 above.

The process begins by receiving a selection of a template for customization of content display for an application at operation 402. The selection is received via a templatization service, such as templatization service 120 in FIG. 1, accessed from a client device, such as client device 104 in FIG. 1. The template selection is made at the client device using the templatization service to select a template and/or customize a template for tenant-specific application presentation. The process receives selections of template configuration options for the selected template at operation 404. The template configuration options may be pre-configured for a given template, or may be customizable for a given template. If a pre-configured template is selected, the pre-configured template configuration options are provided, or received. If a customizable template is selected, individual customized template configuration options are received, based on tenant-selected configuration options for the customizable template.

The selected template and template configuration options are stored with a template identifier for the application at operation 406. The selected template, template configuration options, and template identifier are stored, or cached, at the client-side, such as at client device 104 in FIG. 1. Caching the template, including the template parameters and template ID, in memory at the client device enables the application experience to be controlled according to the selected or customized template rather than a default template without requiring a network call for subsequent boots or refreshes of the application. The process receives a network call to fetch content for the application at operation 408. The network call may be triggered by launch of an instance of the application at a user device, such as client device 104 or user device 106 in FIG. 1. The network call includes the template identifier for the application.

In response to receiving the network call to fetch the application content, the process fetches the content for the application at operation 410 and retrieves the stored template at operation 412. The stored template, retrieved using the template ID, provides the mapping instructions for mapping the application content to the template sections based on template configuration settings or options. The application content is fetched by a call from the template adapter that initializes content holders for fetching specific content types upon launch of the application. Each content holder is responsible for fetching its respective content type in the application, such as a video content holder to fetch video data, or an image content holder to fetch image data, and so forth. Each content holder makes a service API call to fetch content from the content server, such as computing device 102 in FIG. 1, according to its content type. The service API call can interface with a tab level API, a screen level API and a section level API of the network-connected server. In some embodiments, an initial call is made for the tab level API before other calls that bring data for pagination respective to each section or screen.

The process maps the fetched content to sections of the stored template using the stored template configuration options at operation 414 and renders the mapped content for display at a user interface at operation 416. The process terminates thereafter.

In some examples, the processor initializes holders for containing the content of the application. Each holder can correspond to a section of the template and can comprise a content type. The processor can construct each holder to present views with the content according to the default template.

Figure 5:
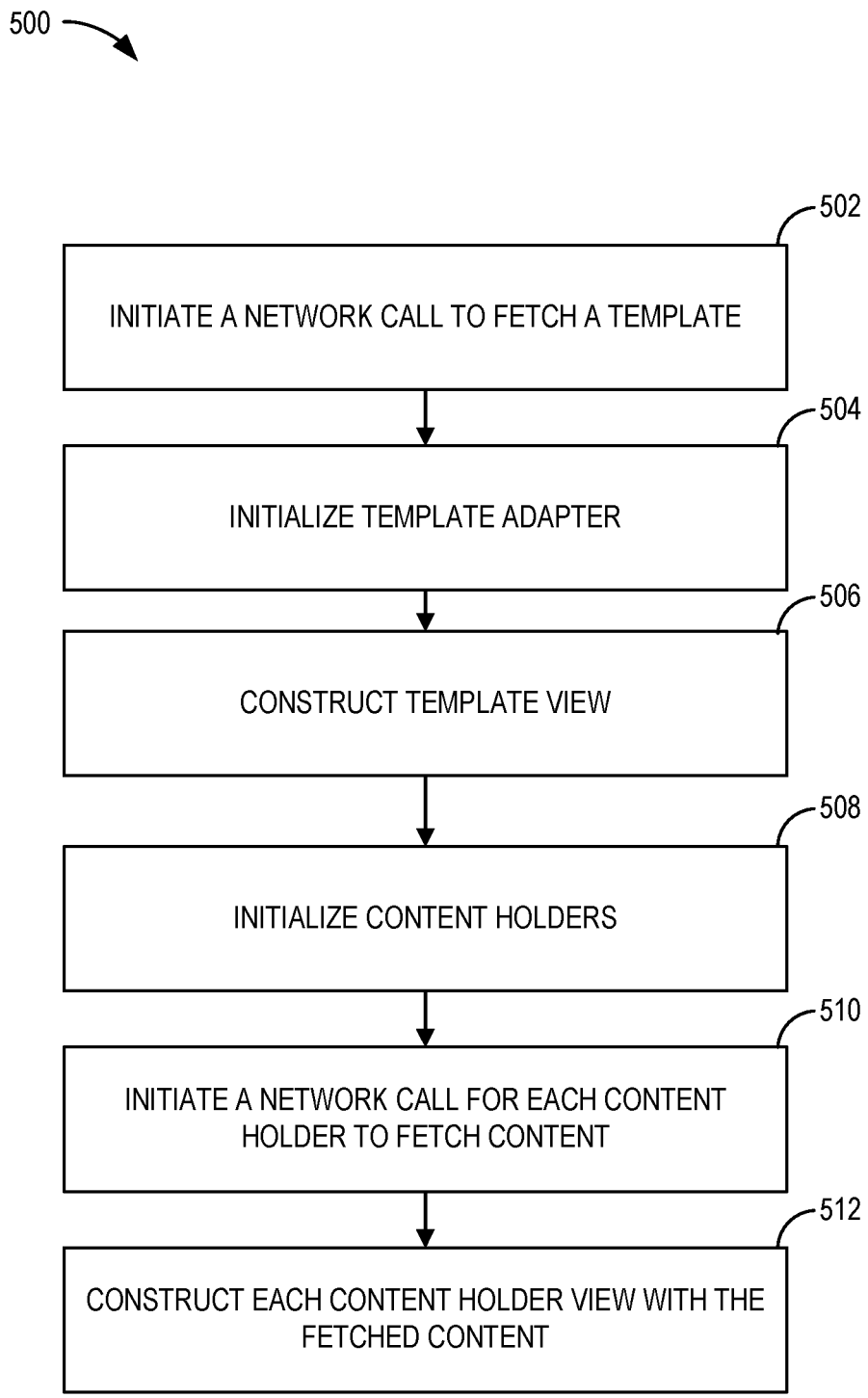
FIG. 5 is an exemplary flow chart illustrating an example process for templatization at a client device.

FIG. 5 is an exemplary flow chart illustrating an example process 500 for templatization at a client device. The process 500 may be implemented within templatization architecture 100 in FIG. 1 and/or by computing devices, such as computing device 102, client device 104, and/or user device 106 in FIG. 1.

The process begins by initiating a network call to fetch a template at operation 502. The network call is initiated by an application, such as upon application launch or the launch of an instance of the application. The call can be a service API call to a network-connected server, a call to a client-side device cache storing template parameters, or both. In some examples, the network call is made with the tenant API, or client-side API, such as template adapter 142 in FIG. 1. The network call can include a template ID corresponding to a particular template associated with the application.

In some examples, while a network call is being made, the application uses a default template to render application content. The resulting rendering can, for example, be a default UI screen shown to the client as a home and discover tab. The content rendered can be based on tenant specific data hosted on a web address or based on generic data coming from the client device.

The process initializes a template adapter at operation 504. In some examples, initialization of the template adapter occurs after the client device receives the template ID and the template parameters for a template of the application in response to the network call.

The process constructs a template view at operation 506 using the template adapter based on the template parameters. The template view comprises the number of sections, the number of tabs, the details for each section and/or tab, the content types, and so on. In some embodiments, the client device can contain pre-implemented template views such as horizontal and vertical scrolling, images, and video views among others.

Upon initialization of the template adapter, the process initializes content holders for application content at operation 508. Each content holder is responsible for fetching its respective content type for the application content.

The process initiates a network call, such as a service API call, for each content holder to fetch content from the server according to its content type at operation 510. The process constructs content holder views with the fetched content at operation 512. In some examples, operation 512 occurs after each content holder receives its respective content. The resulting constructed content holder views enables the content of the application to be rendered according to the template.

Figure 6:
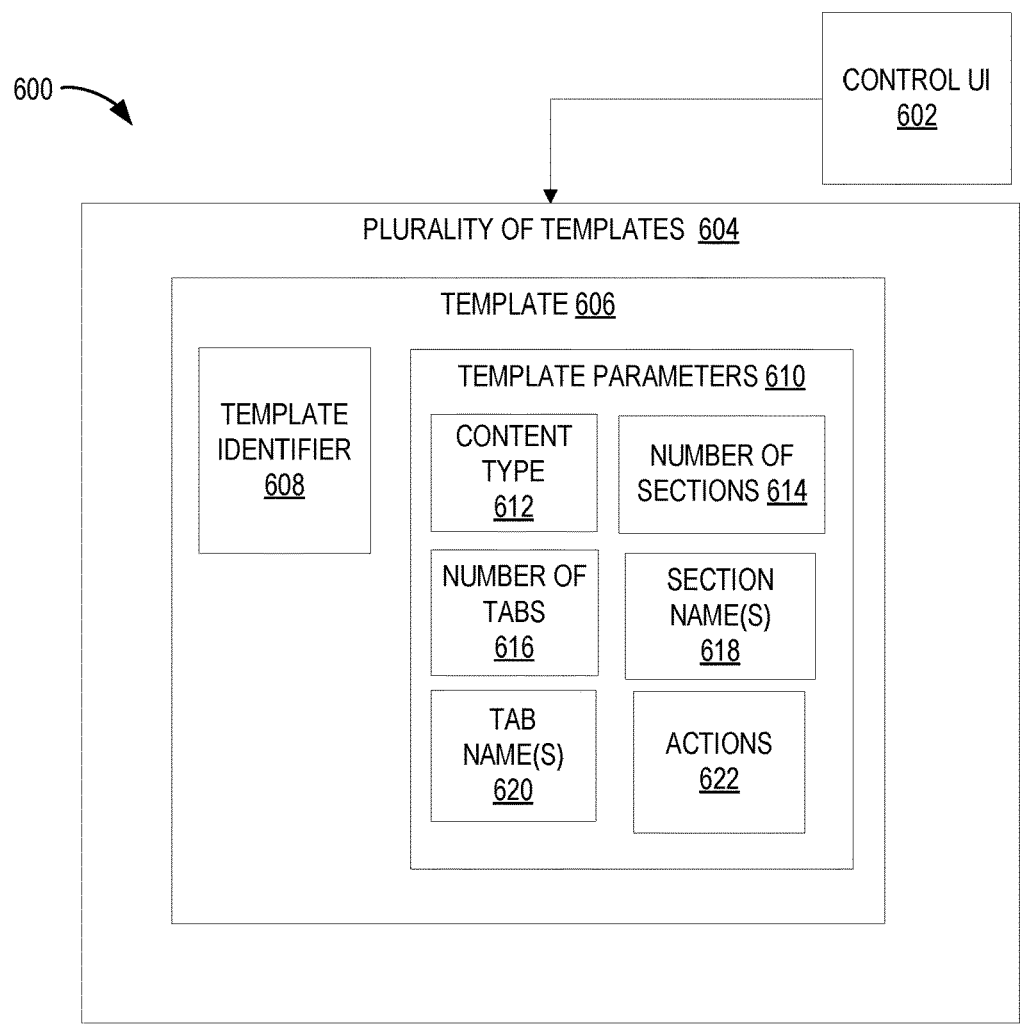
FIG. 6 is an exemplary block diagram illustrating a template for customization of application content.

FIG. 6 is an exemplary block diagram of an illustrative template for customized application content within a templatization environment 600. Environment 600 optionally includes a control UI 602 that provides an authorized user, such as a tenant of tenant environment 108 in FIG. 1, to make a template selection and/or template customization for an application. The control UI 602 can be implemented as a portal, such as portal 148 in FIG. 1, a web page, an application, or some other user interface that allows the authorized user to select a template for an application and/or customize a template for an application.

The control UI 602 presents a plurality of templates 604 for selection and/or customization. Some of the templates are pre-configured, such that the template parameters are pre-set and static, and the application of the template results in customized data representation for application content according to the pre-configured template parameters. Others of the templates are customizable, such that the template parameters themselves are user-configurable and customizable to control template sections and content type in addition to the data representation for application content. Plurality of templates 604 is an illustrative example of plurality of templates 126 in FIG. 1. Each template parameter controls content types for an application and how content is mapped to sections of a template, or containers of a UI, and rendered for presentation at a user interface display.

Each template comprises a unique template identifier, such as template identifier 608 for template 604. The template identifier is used to identify template parameters used as mapping instructions for a template adapter to map application content to the UI according to the template. Template parameters 610 may include content type 612, number of sections 614, number of tabs 616, section name(s) 618, tab name(s) 620, actions 622, and the like. In some examples, such as with pre-configured templates, content type 612, number of sections 614, number of tabs 616, section name(s) 618, tab name(s) 620, actions 622 are fixed within the template. In other examples, such as with customizable templates, content type 612, number of sections 614, number of tabs 616, section name(s) 618, tab name(s) 620, actions 622 are each configurable by the authorized user of the tenant environment to customize one or more of these template parameters for the tenant-side application experience.

Optionally, control UI 602 includes a template selection query that allows a user to input desired template parameter values to identify one or more templates within plurality of templates 604. Control UI 602 can optionally depict a sample UI rendering for a selected template of the plurality of templates 604 to enable selection and customization. The sample UI rendering is an image of at least a portion of the application rendered with any of the user-selected template parameters 610. The sample UI rendering portrays a representation of the UI as it would appear on a client device. In some examples, the sample UI rendering is interactive and enables a user to interact with the simulated application to view a preview of the templatization effect.

EXEMPLARY OPERATING ENVIRONMENT

Figure 7:
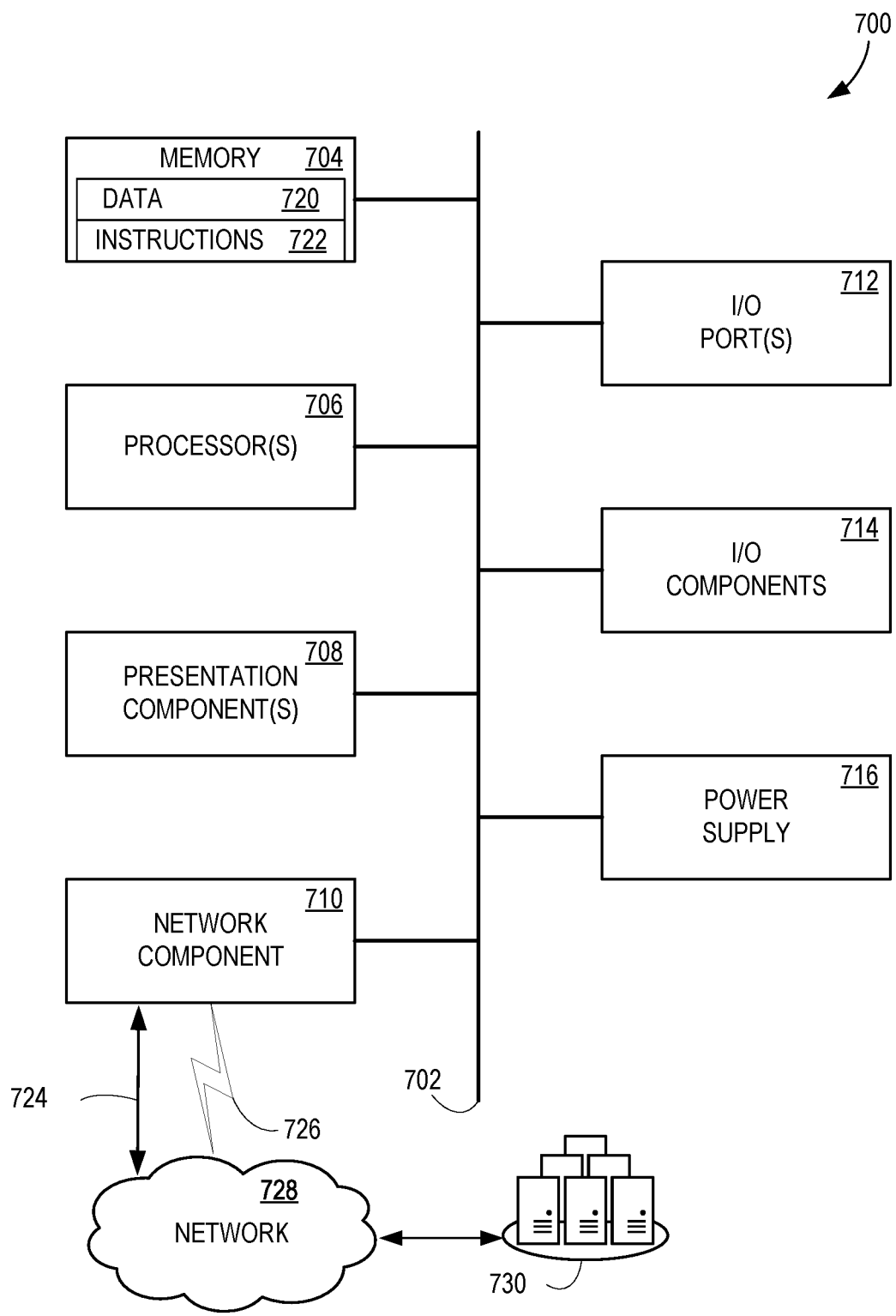
FIG. 7 illustrates a computing apparatus according to an embodiment as a functional block diagram.

FIG. 7 is a block diagram of an example computing device 700 (e.g., a computer storage device) for implementing aspects disclosed herein, and is designated generally as computing device 700. In some examples, one or more computing devices 700 are provided for an on-premises computing solution. In some examples, one or more computing devices 700 are provided as a cloud computing solution. In some examples, a combination of on-premises and cloud computing solutions are used. Computing device 700 is but one example of a suitable computing environment and is not intended to suggest any limitation as to the scope of use or functionality of the examples disclosed herein, whether used singly or as part of a larger set.

Neither should computing device 700 be interpreted as having any dependency or requirement relating to any one or combination of components/modules illustrated. The examples disclosed herein may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The disclosed examples may be practiced in a variety of system configurations, including personal computers, laptops, smart phones, mobile tablets, hand-held devices, consumer electronics, specialty computing devices, etc. The disclosed examples may also be practiced in distributed computing environments when tasks are performed by remote-processing devices that are linked through a communications network.

Computing device 700 includes a bus 702 that directly or indirectly couples the following devices: computer storage memory 704, one or more processors 706, one or more presentation components 708, input/output (I/O) ports 712, I/O components 714, a power supply 716, and a network component 710. While computing device 700 is depicted as a seemingly single device, multiple computing devices 700 may work together and share the depicted device resources. For example, memory 704 may be distributed across multiple devices, and processor(s) 706 may be housed with different devices.

Bus 702 represents what may be one or more busses (such as an address bus, data bus, or a combination thereof). Although the various blocks of FIG. 7 are shown with lines for the sake of clarity, delineating various components may be accomplished with alternative representations. For example, a presentation component such as a display device is an I/O component in some examples, and some examples of processors have their own memory. Distinction is not made between such categories as "workstation," "server," "laptop," "hand-held device," etc., as all are contemplated within the scope of FIG. 7 and the references herein to a "computing device." Memory 704 may take the form of the non-transitory computer storage media referenced below and operatively provide storage of computer-readable instructions, data structures, program modules and other data for the computing device 700. In some examples, memory 704 stores one or more of an operating system, a universal application platform, or other program modules and program data. Memory 704 is thus able to store and access data 720 and instructions 722 that are executable by processor 706 and configured to carry out the various operations disclosed herein.

In some examples, memory 704 includes computer storage media. Memory 704 may include any quantity of memory associated with or accessible by the computing device 700. Memory 704 may be internal to the computing device 700 (as shown in FIG. 7), external to the computing device 700 (not shown), or both (not shown). Additionally, or alternatively, the memory 704 may be distributed across multiple computing devices 700, for example, in a virtualized environment in which instruction processing is carried out on multiple computing devices 700. For the purposes of this disclosure, "computer storage media," "computer storage memory," "memory," and "memory devices" are synonymous terms for the memory 704, and none of these terms include carrier waves or propagating signaling.

Processor(s) 706 may include any quantity of processing units that read data from various entities, such as memory 704 or I/O components 714. Specifically, processor(s) 706 are programmed to execute computer-executable instructions for implementing aspects of the disclosure. The instructions may be performed by the processor, by multiple processors within the computing device 700, or by a processor external to the client computing device 700. In some examples, the processor(s) 706 are programmed to execute instructions such as those illustrated in the flow charts discussed below and depicted in the accompanying drawings. Moreover, in some examples, the processor(s) 706 represent an implementation of analog techniques to perform the operations described herein. For example, the operations may be performed by an analog client computing device 700 and/or a digital client computing device 700. Presentation component(s) 708 present data indications to a user or other device. Exemplary presentation components include a display device, speaker, printing component, vibrating component, etc. One skilled in the art will understand and appreciate that computer data may be presented in a number of ways, such as visually in a graphical user interface (GUI), audibly through speakers, wirelessly between computing devices 700, across a wired connection, or in other ways. I/O ports 712 allow computing device 700 to be logically coupled to other devices including I/O components 714, some of which may be built in. Example I/O components 714 include, for example but without limitation, a microphone, joystick, game pad, satellite dish, scanner, printer, wireless device, etc.

Computing device 700 may operate in a networked environment via the network component 710 using logical connections to one or more remote computers. In some examples, the network component 710 includes a network interface card and/or computer-executable instructions (e.g., a driver) for operating the network interface card. Communication between the computing device XX and other devices may occur using any protocol or mechanism over any wired or wireless connection. In some examples, network component 710 is operable to communicate data over public, private, or hybrid (public and private) using a transfer protocol, between devices wirelessly using short range communication technologies (e.g., near-field communication (NFC), Bluetooth™ branded communications, or the like), or a combination thereof. Network component 710 communicates over wireless communication link 726 and/or a wired communication link 724 to a remote resource 730 (e.g., a cloud resource) across network 728. Various different examples of communication links 724 and 726 include a wireless connection, a wired connection, and/or a dedicated link, and in some examples, at least a portion is routed through the internet.

Although described in connection with an example computing device 700, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, virtual reality (VR) devices, augmented reality (AR) devices, mixed reality devices, holographic device, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions, or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device when configured to execute the instructions described herein.

By way of example and not limitation, computer readable media comprise computer storage media and communication media. Computer storage media include volatile and nonvolatile, removable and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that may be used to store information for access by a computing device. In contrast, communication media typically embody computer readable instructions, data structures, program modules, or the like in a modulated data signal such as a carrier wave or other transport mechanism and include any information delivery media.

In examples involving a general-purpose computer, aspects of the disclosure transform the general-purpose computer into a special-purpose computing device when configured to execute the instructions described herein.

An example computer system comprises: a processor; a user interface (UI) implemented by the processor; a memory communicatively coupled to the processor, the memory storing an application; and a computer readable medium having stored thereon instructions that, when executed by the processor, cause the processor to: store, in a datastore, a template for providing customized content rendering for the application, each template comprising template parameters; obtain, from a tenant, a template selection; update the template based on the template selection; receive a network call for the template from an instance of the application on a client device of the tenant; retrieve the template from the datastore; and transmit the template to the client device for rendering content of the application at the instance of the application on the client device and for caching template parameters on the client device.

Another example computer system comprises: a processor; a user interface (UI) implemented by the processor; a memory communicatively coupled to the processor, the memory storing an application; and a computer readable medium having stored thereon instructions that, when executed by the processor, cause the processor to: initiate, upon launch of an instance of the application on a client device, a call for a template from a network-connected server, the template comprising template parameters; render, upon launch of an instance of the application, content of the application according to a default template on the client device; receive, in response to the call for the template from the network-connected server, the template; reload content of the application, wherein reloading content includes re-rendering the content according to the template parameters; cache, upon reloading content of the application, the template parameters on the client device; fetch content from a server according to the application; and render content of the application according to the template with the cached template parameters on the client device.

One or more exemplary non-transitory computer readable storage media comprise computer-executable instructions for providing UI templatization, cause the processor to at least: a processor; a user interface (UI) implemented by the processor; a memory communicatively coupled to the processor, the memory storing an application; and a computer readable medium having stored thereon instructions that, when executed by the processor, cause the processor to: initiate, upon launch of an instance of the application on a client device, a call for a template from a network-connected server, the template comprising template parameters; render, upon launch of an instance of the application, content of the application according to a default template on the client device; receive, in response to the call for the template from the network-connected server, the template; reload content of the application, wherein reloading content includes re-rendering the content according to the template parameters; cache, upon reloading content of the application, the template parameters on the client device; fetch content from a server according to the application; and render content of the application according to the template with the cached template parameters on the client device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It is understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute exemplary means for initiating upon launch of an instance of the application on a client device, a call for a template from a network-connected server, the template comprising template parameters; means for rendering, upon launch of an instance of the application, content of the application according to a default template on the client device; means for receiving, in response to the call for the template from the network-connected server, the template; means for reloading content of the application, wherein reloading content includes re-rendering the content according to the template parameters; means for caching, upon reloading content of the application, the template parameters on the client device; means for fetching content from a server according to the application; and means for rendering content of the application according to the template with the cached template parameters on the client device.

The term "comprising" is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system comprising: a processor; a memory communicatively coupled to the processor, the memory storing an application; and
    a computer readable medium storing instructions that are operative upon execution by the processor, to: receive a selection of a template from a plurality of templates for the application from a client device in a tenant environment, wherein the template includes template parameters for content rendering and a template identifier; store the selected template for the application in the memory; transmit the selected template to the client device for rendering content of the application, wherein an application interface for the application on the client device is refreshed upon the template selection, and wherein the selected template is cached on the client device; receive a network call for application content upon launch of an instance of the application executing on a user device within the tenant environment, the network call including the template identifier; and transmit the application content to the user device for rendering according to the selected template based on the template identifier, wherein the template parameters include a number of tabs, a number of sections, a number of content types, and a scroll direction for each content type of the number of content types, wherein the selected template stored in the memory is stored in database tables and the content rendering for the application occurs at runtime based on dynamic data from the database tables using the template identifier.

2. The system of claim 1, wherein the template parameters include instructions for mapping the application content to user interface elements via content holders.

3. The system of claim 2, wherein the content holders include at least one of a vertical video content holder, a horizontal video content holder, a vertical image content holder, a horizontal image content holder, a vertical text content holder, a horizontal text content holder, and an actions content holder.

4. The system of claim 2, wherein an individual content holder is associated with a single content data type.

5. The system of claim 1, wherein the instructions are operative upon execution by the processor, to store, in the memory, a customizable template for providing customized template configuration for the application.

6. The system of claim 1, wherein receiving the selection of the template further comprises receiving a layout templatization selection or a customizable templatization selection.

7. The system of claim 6, wherein the layout templatization selection includes configuration selections for data representation within a predefined template.

8. The system of claim 6, wherein the customizable templatization selection includes configuration selections for content types, template elements, and data representation.

9. A system comprising: a processor; a memory communicatively coupled to the processor, the memory storing a template adapter; and the template adapter executed by the processor, to: receive a selected template for an application hosted at a cloud server, the selected template including a template identifier and template parameters; store the selected template in the memory; responsive to receiving a request to launch an instance of the application, initiate a call to obtain application content from the cloud server; map the application content obtained to sections of the selected template stored in the memory based on the template parameters; and render the mapped application content according to the selected template on a user interface display, wherein the template parameters include a number of tabs, a number of sections, a number of content types, and a scroll direction for each content type of the number of content types, wherein the selected template stored in the memory is stored in database tables and the content rendering for the application occurs at runtime based on dynamic data from the database tables using the template identifier.

10. The system of claim 9, the template adapter further executed by the processor to: initiate the call to obtain the application content via content holders of the application interface.

11. The system of claim 10, wherein each of the content holder is associated with an individual content type, and wherein the content holders fetch data by content type.

12. The system of claim 10, wherein the content holders include at least one of a vertical video content holder, a horizontal video content holder, a vertical image content holder, a horizontal image content holder, a vertical text content holder, a horizontal text content holder, and an actions content holder.

13. A computer-implemented method comprising:
receiving, via a templatization service, selection of a template for customization of content display for an application; receiving selections of template configuration options for the selected template; storing the selected template and template configuration options with a template identifier for the application; receiving a network call to fetch content for the application upon launch of an instance of the application at a user device, the network call including the template identifier; responsive to receiving the network call, fetching the content for the application; responsive to receiving the network call, retrieving the stored template using the template identifier; mapping the fetched content to sections of the stored template using the stored template configuration options; and rendering the mapped application content for display at the user device, wherein the template parameters include a number of tabs, a number of sections, a number of content types, and a scroll direction for each content type of the number of content types, wherein the selected template stored in the memory is stored in database tables and the content rendering for the application occurs at runtime based on dynamic data from the database tables using the template identifier.

14. The method of claim 13, wherein receiving the selection of the template further comprises: receiving a layout templatization selection or receiving a customizable templatization selection.

15. The method of claim 13, wherein the template configuration options are selected from a list consisting of: a number of tabs, a direction of content scrolling, a number of sections, content type selections, action type selections, and container placement selections.

16. The method of claim 13, wherein the selected template and template configuration options with the template identifier is cached at a local client-side database.

17. The method of claim 13, wherein fetching the content for the application further comprises: using content holders to fetch the content, each individual content holder of the content holders associated with a single content data type.

* * * * *